(12) United States Patent
Glass et al.

(10) Patent No.: US 11,361,158 B2
(45) Date of Patent: Jun. 14, 2022

(54) LANGUAGE AUTODETECTION FROM NON-CHARACTER SUB-TOKEN SIGNALS

(71) Applicant: Microsoft Technology Licensing, LLC, Redmond, WA (US)

(72) Inventors: Andrew Stuart Glass, Seattle, WA (US); Margaret Hope Magnus, Everett, WA (US); Roland Radtke, Brier, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 34 days.

(21) Appl. No.: 17/024,428

(22) Filed: Sep. 17, 2020

(65) Prior Publication Data

US 2022/0083734 A1    Mar. 17, 2022

(51) Int. Cl.
*G06F 40/263* (2020.01)

(52) U.S. Cl.
CPC .................. *G06F 40/263* (2020.01)

(58) Field of Classification Search
CPC .................................... G06F 40/263
USPC .......................................... 704/9
See application file for complete search history.

(56) References Cited

U.S. PATENT DOCUMENTS

2006/0229865 A1    10/2006  Carlgren et al.
2009/0326918 A1    12/2009  Georgiev et al.

OTHER PUBLICATIONS

Jauhiainen, et al., "Automatic Language Identification in Texts: A Survey", In Repository of arXiv:1804.08186, Apr. 22, 2018, 97 Pages.
"International Search Report and Written Opinion Issued in PCT Application No. PCT/US2021/035563", dated Sep. 23, 2021, 10 Pages.

*Primary Examiner* — Thierry L Pham

(57) ABSTRACT

In non-limiting examples of the present disclosure, systems, methods and devices for determining a language of a text string are presented. A language detection model may be maintained. The language detection model may comprise identities and weights for initial and final consonants, identities and weights for prefixes and suffixes, and identities and weights for vowel sequences, where each identity is derived from a training corpus. The weights may correspond to a frequency of a text unit in the corpus. A text string may be received and a match score between the text string and the language of the language detection model may be determined. The match score may be based on initial and final consonant scores, prefix and suffix scores, and/or vowel sequence scores for each word in the text string. If the match score meets a threshold value a follow-up action associated with the language may be performed.

20 Claims, 12 Drawing Sheets

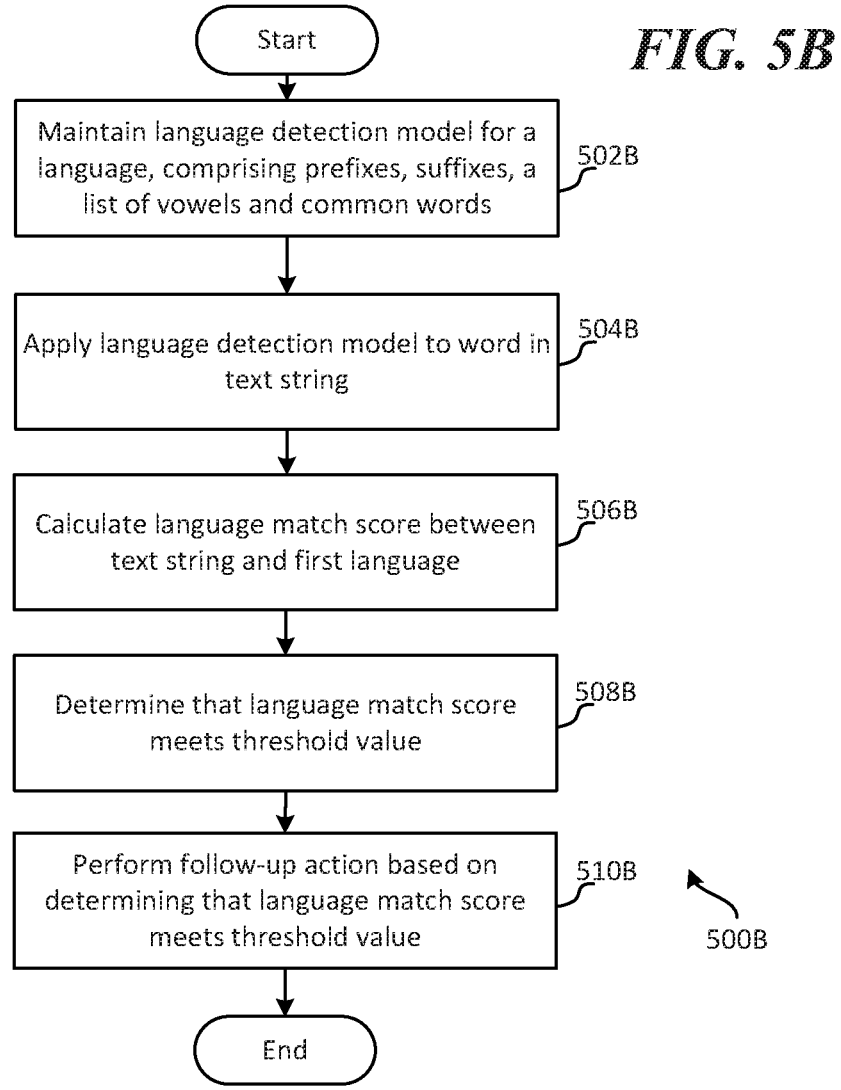

LANGUAGE AUTODETECTION FROM NON-CHARACTER SUB-TOKEN SIGNALS

BACKGROUND

Text input on computing devices increasingly depends on language-specific processing to refine and respond to user intent. Such processing depends on a core assumption that the language of the text being entered is known. These systems perform poorly when the assumed language does not match the entered text. To address this, systems may use a pre-processing step to identify the language of the incoming text strings.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for determining a language of a text string input to a computing device. A language detection application or service may maintain a language detection model for one or more languages. A language detection model may include identities of a plurality of prefixes and weights associated with those prefixes, as identified in a corpus for a language; identities of a plurality of suffixes and weights associated with those suffixes, as identified in a corpus for a language; identities of a plurality of initial consonants and weights associated with those initial consonants, as identified in a corpus for a language; identities of a plurality of final consonants and weights associated with those final consonants, as identified in a corpus for a language; and identities of vowel sequences and weights associated with those vowel sequences, as identified in a corpus for a language. The weights associated with each of those partial words (e.g., "tokens") may correspond to a frequency of a partial word in a corpus (e.g., the higher the frequency, the higher the weight).

When a text string input is received, one or more of the language detection models may be applied to the text string. A match score between the text string and each language corresponding to an applied language detection model may be determined based on the prefixes and suffixes included in the words of the text string, the syllables included in the words of the text string, where a syllable is defined as an optional legal initial consonant sequence as defined in the model followed by an obligatory legal vowel sequence as defined by the model followed by an optional legal final consonant sequence as defined in the model. A legal word or stem is one which consists solely of a contiguous sequence of legal syllables. In some examples, if a match score for a language detection model meets a threshold value, a determination may be made that the text string is in that corresponding language. In additional examples, a text string may be determined to relate to a language associated with a match score for a highest scoring language detection model.

BRIEF DESCRIPTION OF THE DRAWINGS

Non-limiting and non-exhaustive examples are described with reference to the following figures:

FIG. 5B is a method for determining whether a text string matches a language using an affix-based model and performing a follow-up action based on the determining.

DETAILED DESCRIPTION

Figure 1:
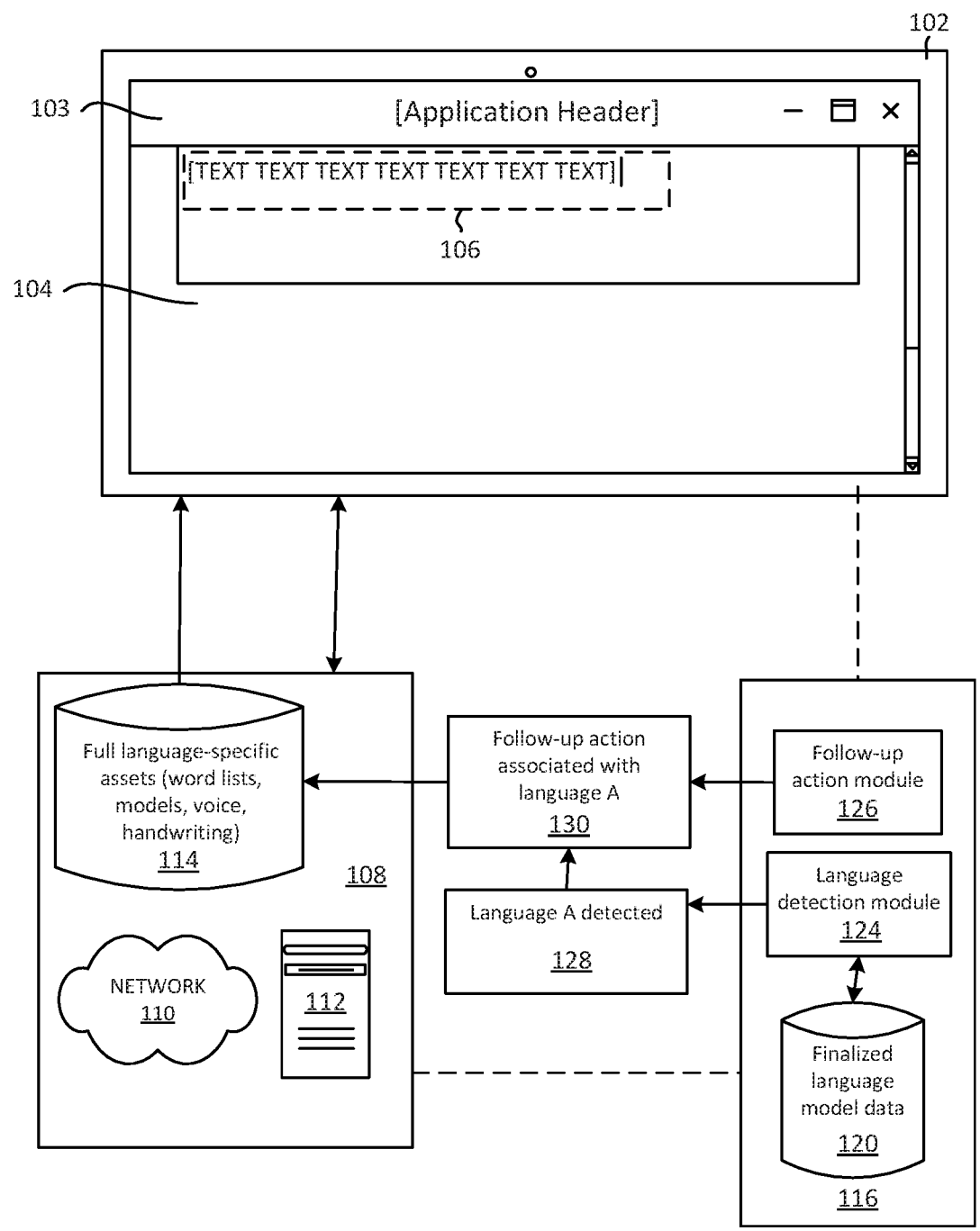
FIG. 1 is a schematic diagram illustrating an example distributed computing environment for determining a language of a text string and performing one or more follow-up actions based on that determination.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Non-limiting examples of the present disclosure describe systems, methods and devices for determining a language of a text string input into a construct of a computing device. The construct that the text string is input in may comprise an operating system shell construct, an application construct, or an application service (e.g., cloud-based service) construct. An indication to analyze text utilizing the language detection models described herein may be received by a language detection service. The language detection service may be incorporated and executed on a local computing device and/or in the cloud. The indication may comprise a determination that a text input has not previously been received by a user account in a construct where a text string input is currently being received, and/or that a user account has not set up a preferred language for a computing device, application or service. In some examples, the language detection service described herein may simply apply the language detection models periodically or whenever a text input is received in one or more computing constructs.

The language detection service may comprise a separate language detection model for each of a plurality of languages (e.g., one model for English, one model for German, one model for Spanish). Each of the models may comprise same or similar processing engines, but different weighted lists of linguistic components (e.g., prefixes, suffixes, vowel sequences, initial consonant sequences, final consonant sequences, common words), sometimes referred to herein as "tokens". These separate language models may be trained such that the weights of each token correspond to their relative frequency in the language, or more specifically, to their relative frequency in one or more corpuses that the models are trained on.

At run time, when a text string input is received, the language detection service may apply one or more of the language detection models to the text string and calculate a match score for each word in the string to each language corresponding to the models that are applied. The scores for each word may be summed or otherwise functionally processed to generate a total match score for the text string and the language. In some examples, if a determination is made that a match score between a text string and a language meets or exceeds a threshold value, a determination may be made that the text string is definitely in that language, possibly/probably in that language, or definitely not in that language. In other examples, the language detection service may determine that a language associated with a highest ranked match score from amongst a plurality of scores from a plurality of language detection models is the language of the text string.

Various follow-up actions may be performed based on a determination that a text string is probably in a specific language. For example, a language processing model (e.g., intent determination processing model, spellcheck processing model, grammar check processing model, etc.) of the specific language may be applied to the text string. The type of language processing model that is applied in the specific language may be determined based on an application or computing shell construct that the text string was received in. In some examples, the follow-up action may comprise downloading one or more linguistic libraries or models in the specific language from a cloud database to a local computing device on which the text string was received.

The systems, methods, and devices described herein provide technical advantages for identifying a language of input text. Memory costs associated with traditional language detection models, such as n-gram models, that rely on frequencies of strings of characters of length N, are greatly reduced via application of the mechanisms described herein in that a relatively small model comprised of initial and final consonants, vowel sequences, common words, and prefixes and suffixes may be maintained to process text input. The language detection models described herein and their corresponding libraries may be maintained entirely on local computing devices, and larger processing models and associated language libraries (e.g., for use by digital assistants, for use by productivity applications) may only be downloaded to those local computing devices upon making a determination of a user's primary input language. Additionally, aspects of the present disclosure combine linguistic awareness of token structure and frequency analysis. This approach avoids noise that naturally occurs with character n-gram models which cannot accommodate morpheme and syllable boundaries.

FIG. 1 is a schematic diagram illustrating an example distributed computing environment 100 for determining a language of a text string and performing one or more follow-up actions based on that determination. Computing environment 100 includes computing device 102, network and processing sub-environment 108 language detection sub-environment 116 which contains, language detection module 124, a plurality of language detection models which may be included in language model data store 120, and follow-up action module 126. A common follow-up action might be to download or otherwise deploy the full suite of language assets 114.

Network and processing sub-environment 108 includes network 110 and server computing device 112. Any of the computing devices described herein may communicate with one another via a network, such as network 110. Server computing device 112 is illustrative of one or more servers that may host one or more application services. The one or more application services may be accessed via the Internet from one or more local computing devices, such as computing device 102, and those application services may be executed in the cloud.

A language detection service, which is generically illustrated in language detection models sub-environment 116, may be hosted and executed in the cloud (e.g., by server computing device 112), and/or the language detection service may be hosted and executed by a local computing device (e.g., computing device 102). In fact, one of the technical advantages of the language detection models described herein is that they are sufficiently small (e.g., from a memory requirement and storage footprint) that they can easily reside on limited storage provided by local computing devices, and they therefore need not necessarily be executed in the cloud.

The language detection service may perform operations associated with receiving text strings in computing shell constructs (e.g., desktop search bar, digital assistant input) or application constructs (e.g., web search in web browser application, document canvas in word processing application) input on a local computing device, processing those text strings with the different language models, and determining a language of the input text. In some examples, the language detection service may cause one or more follow-up actions to be taken on input text, or in association with a determined language of input text.

Language detection models sub-environment 116 includes language detection module 124, and follow-up action module 126. The elements described in relation to language detection models sub-environment 116 may be encompassed in the language detection service.

Figure 2:
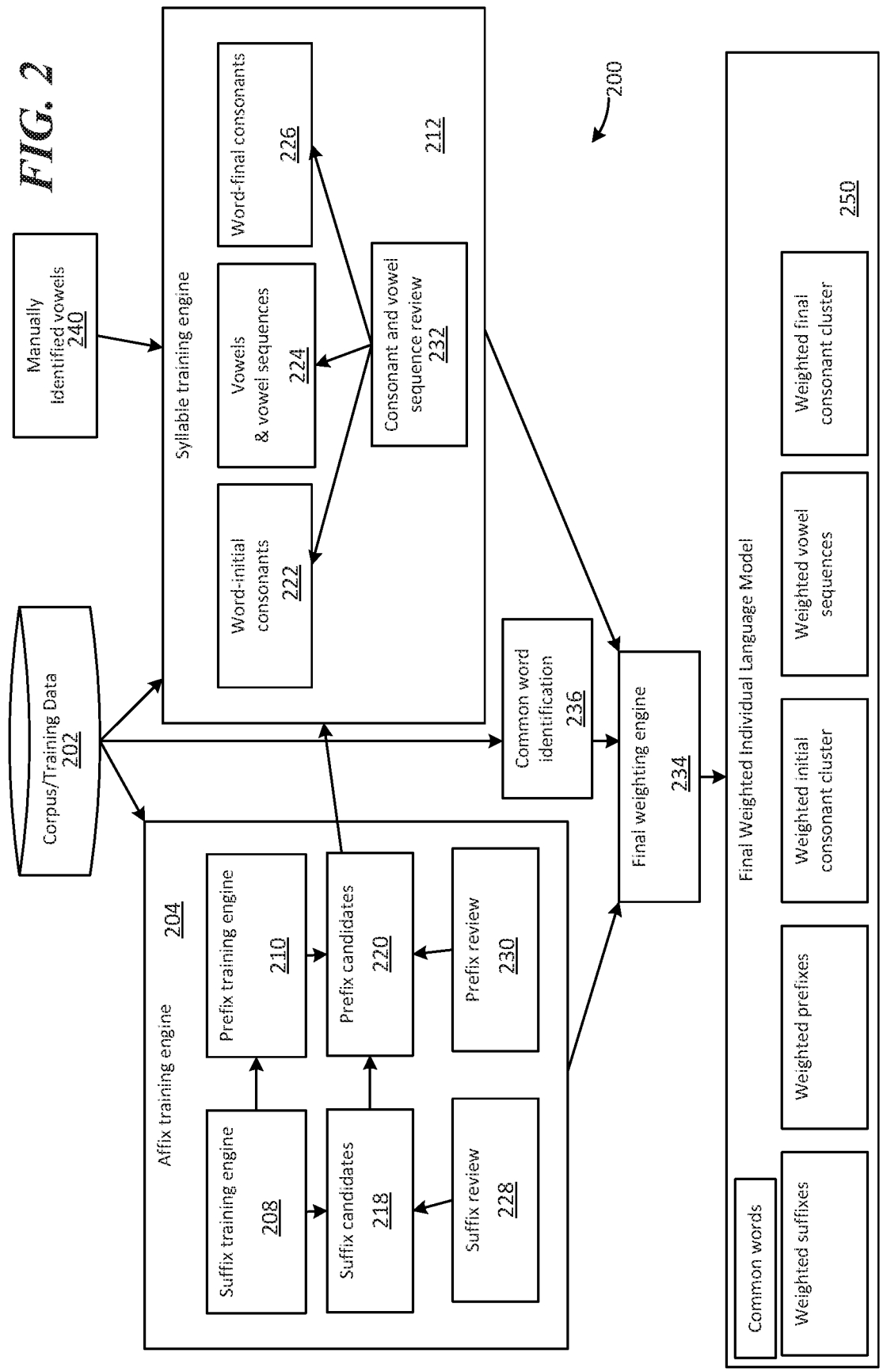
FIG. 2 is a schematic diagram of a computing environment illustrating the training of a language detection model.

As illustrated in FIG. 2, a language detection training engine may generate weighted lists, for one or more languages, of prefixes, suffixes, initial consonants, vowel sequences, and/or final consonants. The lists may be generated from one or more corpuses for each language that the language detection service maintains a model for. These corpuses may be encompassed in a training data store.

The training of a language dataset may result in the weighted lists of tokens (e.g., weighted vowel sequences, weighted prefixes, weighted suffixes, weighted initial consonants, weighted final consonants). The weights that are assigned to the tokens may correspond to a frequency of the token in one or more corpuses that were used to train the model for the language. A plurality of final weighted lists for each language (e.g., final weighted individual language model 250 in FIG. 2) may be encompassed in a data store associated with the language detection service, such as language model data store 120. Additional details regarding the training of the language detection models is described below in relation to FIG. 2 and FIG. 3.

In some examples, a language detection model may be optimized to differentiate between closely related languages (e.g., Danish and Norwegian). For example, an affix inventory may be modified to ensure that every first language (e.g., Norwegian) suffix has its second language (e.g., Danish) counterpart, and every second language suffix has its first language counterpart. Then, the training data may be modified so that the first and second language training data have a high degree of similarity such that the weights that are subsequently assigned to the affixes are also aligned.

Language detection module 124 may comprise one or more processing engines that are applied to input text strings, in association with language model data (e.g., from language model data store 120), to determine the language of the input text strings. Additional details regarding the application of language models to text strings are described below in relation to FIG. 4.

Once a determination is made that input text corresponds to a specific language, follow-up action module 126 may cause one or more actions to be taken on the input text, and/or one or more actions associated with the determined language to be performed. In some examples, the action may comprise applying a language processing model of the determined language to the input text string. For example, if a determination is made that an input text string is English, and the input text string is received by a digital assistant service construct, the text string may be processed utilizing an English language intent identification processing model. In another specific example, if a determination is made that an input text string is in German, and the input text string is received in a word processing document, a German language spelling or grammar check processing model may be applied to the text string.

Thus, follow-up action module 126 may identify an appropriate language processing model and/or action to take based on the construct in which an input text string is received as well as a specific language of the text string that is determined. In additional examples, upon determining that a text string corresponds to a specific language, follow-up action module 126 may identify one or more language libraries and/or language models to be downloaded to the device on which the text was received. For example, if a determination is made that an input text string received by computing device 102 is in language X, follow-up action module 126 may cause one or more language libraries or language models (in language X) from full suite of language assets 114 to be downloaded to computing device 102 from the cloud. As such, a local computing device need only download and store language libraries and language models that are likely to be utilized by users of the local computing device.

In this example, computing device 102 displays application 103, which is illustrative of any application that may be accessed and/or executed by a local computing device. Application 103 may comprise a word processing application, a spreadsheet application, a presentation application, a task completion application, a messaging application, a web browser application, or a gaming application, for example. Application 103 may be executed on computing device 102 or in the cloud. A user has entered text string 106 on canvas 104 of application 103.

The language detection service may receive and process text from an application or shell construct executed by a local computing device based on the text being input into the specific construct an initial time and/or based on receiving an indication that previously-entered text may have been processed with a language model that does not match an input text language. When the language detection service receives text string 106, it may apply one or more language detection models to it.

In applying a language detection model to text string 106, tokens from each word in the string may be extracted and analyzed. For example, a determination may be made as to whether each word in text string 106 has a prefix or a suffix that is included in the language model (e.g. list of weighted prefixes or weighted suffixes for the language model). Each prefix or suffix that is identified may be scored based on the corresponding weight of the prefix/suffix in the language model. The full word or the stem (remaining after identified affixes are stripped) may be iteratively analyzed into syllables using the initial consonant cluster list, the vowel list and the final consonant cluster list in a specific sequence. According to some examples, inter-token scores may also be determined for words in text string 106. A final language match score for a language detection model may be calculated from one or more of the above-described token scores. A highest scoring language detection model may be determined to correspond to the language that the text string is in.

An example of application of a language detection model to a word of a text string is provided below for ease of illustration.

For the word "ANTIDISESTABLISHMENTARY" application of a language detection model according to examples described herein may include the following operations/processing steps.

Find the longest suffix sequence that matches the end of the word. ANTIESTABLISH-MENTARY.

Check whether remainder is at least N characters (N=2, 3, depending on language), if not, try again with shorter suffix.

Check whether remainder has a vowel, if not, try again with a shorter suffix.

Check the preceding consonant sequence for compatibility with final consonant sequence list (algorithm varies depending on whether suffix begins with a vowel). If not, try again with a shorter suffix.

Once a suffix has been chosen, strip it and check the beginning of the remaining stem for a longest matching prefix sequence ANTI-DIS-ESTABLISH.

Check whether remainder (stem) is at least N characters (N=1, 2, 3, depending on language), if not, try again with shorter prefix.

Check whether remainder has a vowel. If not, try again with shorter prefix.

Check the following consonant sequence for compatibility with initial consonant sequence list (algorithm varies depending on whether prefix ends with a vowel). If not, try again with shorter prefix.

Analyze stem into syllables (iterative) (#-E-S)(T-A-B)(L-I-SH).

Strip initial consonant cluster #-ESTABLISH.

Identify best sequence of vowel clusters following the consonant cluster E-STABLISH.

Identify the best final consonant/initial consonant cluster combination S-T-ABLISH.

Identify best sequence of vowel clusters following the consonant cluster A-BLISH.

Identify the best final consonant/initial consonant cluster combination B-L-ISH.

Identify best sequence of vowel clusters following the consonant cluster I-SH.

Identify the best final consonant/initial consonant cluster combination SH.

Add up the log probabilities for these components to determine a syllable score.

Interpolate log probabilities for syllable/prefix/suffix.

Moving back to the example of FIG. 1, the language detection service makes a determination that text string 106 corresponds to language A, as illustrated by language detection element 128. As such, the language detection service may cause one or more actions to be performed, as illustrated by follow-up action element 130.

FIG. 2 is a schematic diagram of a computing environment 200 illustrating the training of a language detection model. Computing environment 200 includes corpus 202, affix detection training engine 204, syllabifier token detection training engine 212, final weighting engine 234, and final weighted individual language model 250.

Training may occur in three phases: first a preliminary list of tokens may be identified (e.g., suffix candidates 218, prefix candidates 220, word-initial consonants 222, vowels and vowel sequences 224, word-final consonants 226), then this preliminary list may be manually reviewed and finalized via a plurality of processes (e.g., suffix review 228, prefix review 230, consonant and vowel sequence review 232), and finally once the inventory of tokens is established, the reviewed lists may be weighted by applying the weights from the corpus (e.g., corpus 202) to the finalized lists (e.g., suffix candidates 218, prefix candidates 220, word-initial consonants 222, vowels and vowel sequences 224, word-final consonants 226) In cases where the model is comprised of both 1) weighted lists of suffixes and prefixes (e.g., suffix candidates 218, prefix candidates 220), as well as 2) weighted lists required to do a syllable analysis of the stem remaining after prefixes and suffixes are stripped (e.g., word-initial consonants 222, vowels and vowel sequences 224, word-final consonants 226), identification and weighting of suffix candidates 218 and prefix candidates 220 may precede identification and weighting of tokens required for syllable analysis (e.g., word-initial consonants 222, vowels and vowel sequences 224, word-final consonants 226). Identification of tokens required for syllable analysis may require that the vowels in the language being trained be manually identified prior to training.

Affix detection training engine 204 includes suffix training engine 208, prefix training engine 210 and manual review of the preliminary affix lists extracted from corpus 202. Syllabifier token detection training engine 212 includes word-initial consonants 222, vowels and vowel sequences 224 and word-final consonants 226. Stem- or word-initial and stem- or word-final consonant clusters may be used to determine syllable-initial and syllable-final consonant clusters for that language, because it is rare that a word-internal syllable may end on a consonant cluster that may not also end a word. In case both an affix detection engine as well as a syllable detection engine are trained, the affix detection engine will likely be applied before the syllable detection. Syllable detection training also may include manual review of word-initial consonants 222, vowels and vowel sequences 224 and word-final consonants 226. Affix detection training engine 204 and syllabifier token detection training engine 212 as well as final weighting engine 234 are illustrative of the training processes that may be utilized for training a language detection model. A final model for a given language may consist of one or more of the final weighted lists in final weighted individual language model 250. A plurality of weighted lists for various languages may be comprised in language model data store 120 in FIG. 1.

Affix detection training engine 204 may receive a plurality of words from corpus 202. The words that are received from corpus 202 are in a language that the resulting language detection model will be trained to detect. For example, if language detection training engine is being implemented to train an English language detection model, corpus 202 will comprise a plurality of English words. Alternatively, if language detection training engine is being implemented to train a German language detection model, corpus 202 will comprise a plurality of German words.

Suffix training engine 208 may identify and extract suffixes in words from corpus 202. In identifying and extracting the suffixes, suffix training engine 208 may search the endings of words in corpus 202 for n-grams of length 1–N, where N depends on the language of corpus 202. For example, a manual determination may be made for a first language that suffix sequences are only likely to be five characters (e.g., letters) or less, and as such, suffixes of from one character to five characters (1–N=1-5) are to be identified and extracted. Suffix training engine 208 may identify sequences of characters at the endings of words having length 1–N that occur with a threshold frequency in corpus 202 and tag them as likely being suffixes.

Prefix training engine 210 may identify and extract prefixes in words from corpus 202. In identifying and extracting the prefixes, prefix training engine 210 may search beginnings of words in corpus 202 for n-grams of length 1–N, where N depends on the language of corpus 202. For example, a manual determination may be made for a first language that prefix sequences are only likely to be six characters (e.g., letters) or less, and as such, prefixes of from one character to six characters (1–N=1-6) are to be identified and extracted. Prefix training engine 210 may identify sequences of characters at the beginnings of words having length 1–N that occur with a threshold frequency in corpus 202 and tag them as likely being prefixes.

According to some examples upon applying suffix training engine 208 and/or prefix training engine 210 to a word in corpus 202, the resulting word stem (e.g., the characters minus the identified/extracted prefix and/or suffix) must have to be at least a threshold number of characters long and include at least one vowel. If a resulting word stem is determined not to be at least the threshold number of characters long and include at least one vowel, that word and/or the prefix or suffix that has been identified for that specific word may be rejected from the training process and shorter prefixes/suffixes tested.

In some examples, a manual review of the identified prefixes and suffixes may be made. That is, a person familiar with the language may manually review the list of prefix candidates (e.g., prefix candidates 220) and discard any prefixes that are not real prefixes in the language that the model is being built/trained for. This is illustrated by prefix review 230. Similarly, a person familiar with the language may manually review the list of suffix candidates (e.g., suffix candidates 218) and discard any suffixes that are not real suffixes in the language that the model is being built/trained for. This is illustrated by suffix review 228.

Syllabifier token detection training engine 212 may strip prefixes and suffixes included in the lists associated with prefix candidates 220 and suffix candidates 218 and identify and extract initial consonant and final consonant sequences in the remaining substring (e.g., stem). Syllabifier token detection training engine 212 may additionally collect and count the vowel sequences that immediately follow the beginning consonant sequences or immediately precede the final consonant sequences. In examples, any string of initial or final non-vowels of length zero or more may be treated as a consonant sequence.

According to some examples, the consonant and vowel sequence candidates (e.g., word-initial consonants 222, vowels and vowel sequences 224, word-final consonants 226) may be manually reviewed, as illustrated by consonant and vowel sequence review 232. That is, a person familiar with the language may manually review the unique consonant and vowel sequences and discard uncommon ones and any that result from noise in the training data (e.g., proper nouns, foreign nouns). In some examples, monosyllabic vowel sequences may be split across syllables (e.g., "ayo" in "mayor" may be split into "ay" and "o").

Once the final inventory of tokens (e.g., suffix candidates 218, prefix candidates 220, word-initial consonants 222, vowels and vowel sequences 224, word-final consonants 226) and the final list of common words 236 are established, the final weights for each of the tokens may be assigned by retraining the entire token list against corpus 202 by final weighting engine 234. The most common words often have a rather unique structure in the language, so very common words (as defined in final list of common words 236) may be ignored in corpus 202 when establishing weights for the other tokens.

In training the model, the prefixes and suffixes in the token list (e.g., prefix candidates 220 and suffix candidates 218) may be sorted in decreasing order of length. If a word begins with a prefix or ends with a suffix, a determination may be made as to whether the beginning or end of the remaining substring starts or ends with a legal consonant sequence (including the null sequence if that is allowed in the language). If a determination is made that the consonant sequence is not legal, or if the remainder of the word does not contain a vowel, the next shortest prefix or suffix may be identified in the list that matches the word. For example, in the word "render", the training may determine that "re-" is a prefix, but then discard it, because "nd" is not in the list of consonant sequences that can legally begin an English word. This step may also be utilized to avoid falsely counting the suffix as "-ion", as in "lion".

In some examples, an additional step may be performed when processing the suffixes. If a suffix begins with a vowel and the preceding consonant sequence cannot end the word, a determination may be made as to whether there is a legal final/initial consonant combination. For example, the suffix "-ation" (as in "amalgamation") is found when parsing the word "filtration". After stripping "-ation", the remaining substring is "filtr". Since the character sequence "tr" cannot legally end an English syllable, the suffix may be rejected, but because the suffix begins with a vowel, and because a legal sequence can be created comprising a vowel, final consonant cluster, initial consonant cluster combination (e.g., i/l/tr), "-ation" may be counted as a suffix in the case of "filtration".

When performing this training, final weighting engine 234 may process the suffixes prior to processing the prefixes.

Once the prefixes and suffixes have been stripped from a word, final weighting engine 234 may divide what remains into syllables. For example, for the word "fungicide", the previous steps performed by model training engine 234 would identify the suffix "-cide", leaving "fungi". Final weighting engine 234 may add weight (e.g., add 1) to the initial cluster "f", as well as the vowel sequences "u" and "i". This leaves the sequence "ng". An English word cannot legally start with the sequence "ng", but there are still two legal options. Those options are splitting the string into "n-g" or "ng-#". Final weighting engine 234 may select the option with the highest combined weight. For example, if the weight for "ng-#" is 180 and the weight of "n-g" is 250, final weighting engine 234 may select "n-g" and add weight to "n" as a final cluster and weight to "g" as an initial cluster.

If final weighting engine 234 cannot build a legal word utilizing the described steps above (e.g., the word does not have any vowels, or starts with an illegal English cluster, like "kjenne") the word may be ignored for training purposes.

The training performed by final weighting engine 234 may complete by taking the logarithm of the probabilities of these final counts.

Figure 3:
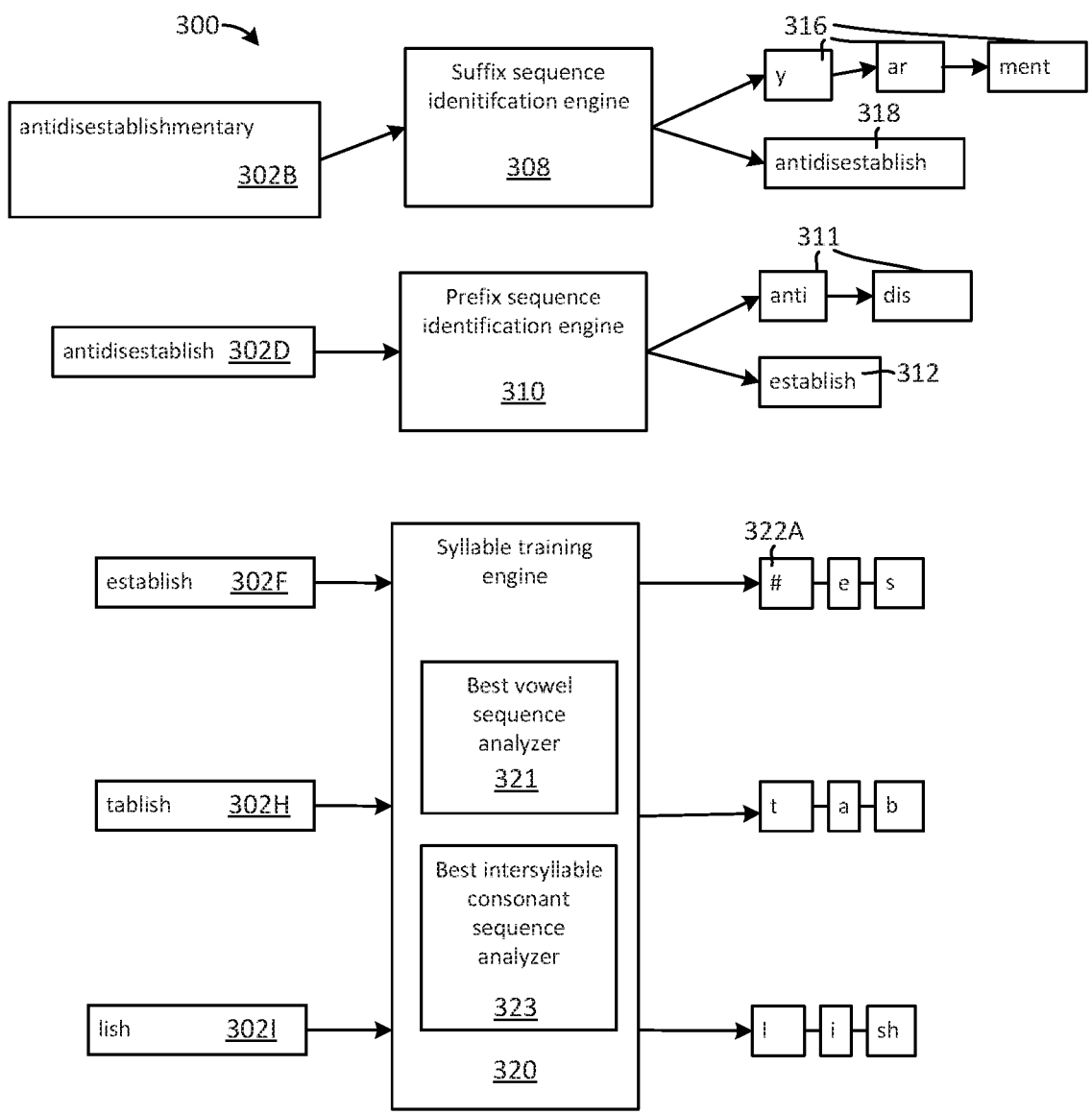
FIG. 3 illustrates a computing environment for the processing of an exemplary word from a corpus by a plurality of processing engines encompassed in a language detection training engine.

FIG. 3 illustrates a computing environment 300 for the processing of an exemplary word from a corpus for a single language by a plurality of processing engines encompassed in a language detection training engine for that language. Although the processing described in relation to FIG. 3 is illustrated as being performed by a plurality of processing engines, it should be understood that each of the illustrated engines could be encompassed in a single processing engine and applied to a text string via application of a language detection model. It should be understood that a single processing engine may be used for all the languages, the differences between languages being encompassed solely in their models (e.g., in final weighted individual language model 250). The exemplary word is 'antidisestablishmentary', its prefixes are 'anti' and 'dis' and its suffixes are 'ment', 'ar' and 'y'. Its stem is 'establish'.

Suffix sequence identification engine 308 is applied to exemplary word 302B, resulting in the identification of suffixes 316 ("y", the "ar" then "ment" from the back), which are stripped from remaining characters 318 ("antidisestablish") (e.g., exemplary subword 302D).

Prefix sequence identification engine 310 is applied to exemplary subword 302D, "antidisestablish", resulting in the identification of prefixes 311 ("anti" and "dis"), which are stripped from the remaining characters 312, which is the stem 302F ("establish").

Syllable training engine 320 is applied to stem 302F "establish", resulting in the identification of an empty initial consonant sequence 322A ("#") because "establish" begins with a vowel.

Vowel sequence analyzer 321 determines that "i" forms a single syllable and is therefore the best (and only possible) analysis of "i". Best intersyllable consonant sequence analyzer 323 determines which of three possible analyses for the intersyllable consonant sequence is best. The sequence is "st" and the three possible analyses are "st-", "s-t" and "-st". It chooses "s-t" because the probability of syllable-final "s" plus the probability of syllable-initial "t" is greater than that of the combined probabilities of the other options. Syllable training proceeds iteratively to analyze the two remaining syllables in sequence 302H and ends with the final syllable 302I "lish" because it is not followed by a vowel.

Each of the tokens identified by the engines illustrated in FIG. 3 may be added to a token list in the language model (e.g., in final weighted individual language model 250) and have their weights normalized once the engines have been applied to the remaining words in corpus 202.

Figure 4:
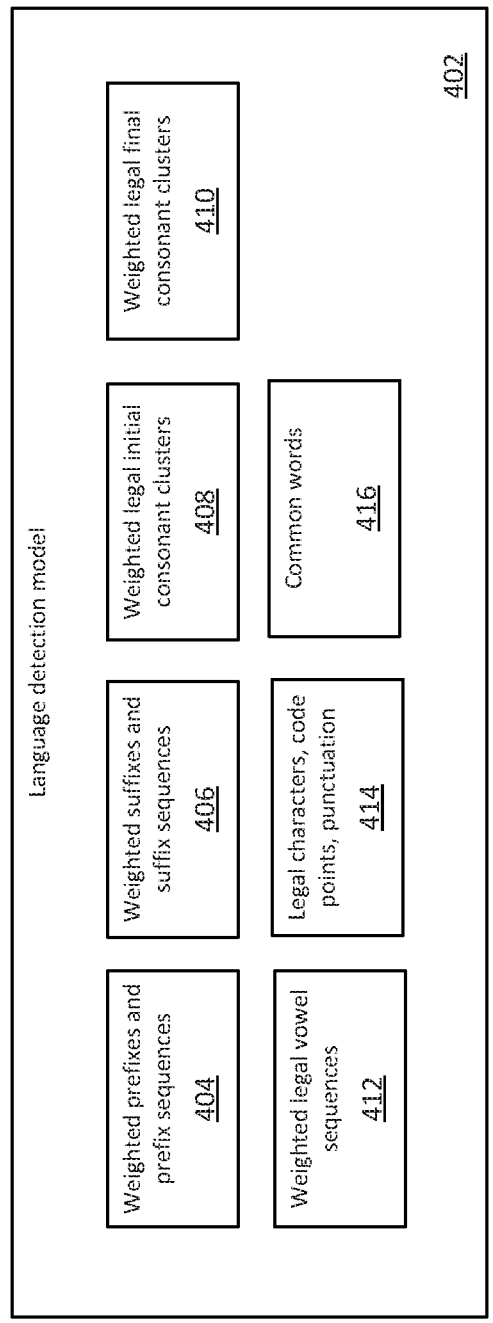
FIG. 4 illustrates various components of a language detection model.

FIG. 4 illustrates various components of a language detection model 402, which is the same or similar as final weighted individual language model 250 in FIG. 2. Language detection model 402 comprises weighted prefixes and prefix sequences 404, weighted suffixes and suffix sequences 406, weighted legal initial consonant clusters 408, weighted legal final consonant clusters 410, weighted legal vowel sequences 412, legal characters, code points, punctuation 414, and common words 416, which also may be weighted.

Weighted prefixes and prefix sequences 404 include the character strings that were identified via prefix training engine 210, and which may have had their weights adjusted via application of one or more operations associated with prefix review 230.

Weighted suffixes and suffix sequences 406 include character strings that were identified via suffix training engine 208, and which may have had their weights adjusted via application of one or more operations associated with suffix review 228.

Weighted legal initial consonant clusters 408 include initial consonant cluster strings that were identified via syllabifier token detection training engine 212, and which may have had their weights adjusted via application of one or more operations associated with consonant and vowel sequence review 232.

Weighted legal final consonant clusters 410 include final consonant cluster strings that were identified via syllabifier token detection training engine 212, and which may have had their weights adjusted via application of one or more operations associated with consonant and vowel sequence review 232.

Weighted legal vowel sequences 412 include vowels and vowel sequences that were identified via syllabifier token detection training engine 212, and which may have had their weights adjusted via application of one or more operations associated with consonant and vowel sequence review 232.

Legal characters, code points, punctuation 414 may include a list of legal characters, code points, and/or punctuation that are highly indicative of a specific language (e.g., an upside-down question mark may correspond to 99% likelihood that a string is Spanish).

Common words 416 may include a list of words that are highly indicative of a specific language.

At runtime (e.g., when a text string input is received) and an indication is received to determine a language associated with a text string comprising one or more words, one or more language detection models, such as language detection model 402, for one or more languages may be applied to the text string. A score for the string for the candidate language may be obtained based on the fit of the string to the frequencies of prefixes, suffixes, and syllables in language detection model 402. The presence of syllables not occurring in the model strongly indicates that the string is not a match with the language of the model. A string may be tested against multiple candidate language models and the scores for each model may be compared to obtain a confidence score for the language of the string.

Figure 5A:
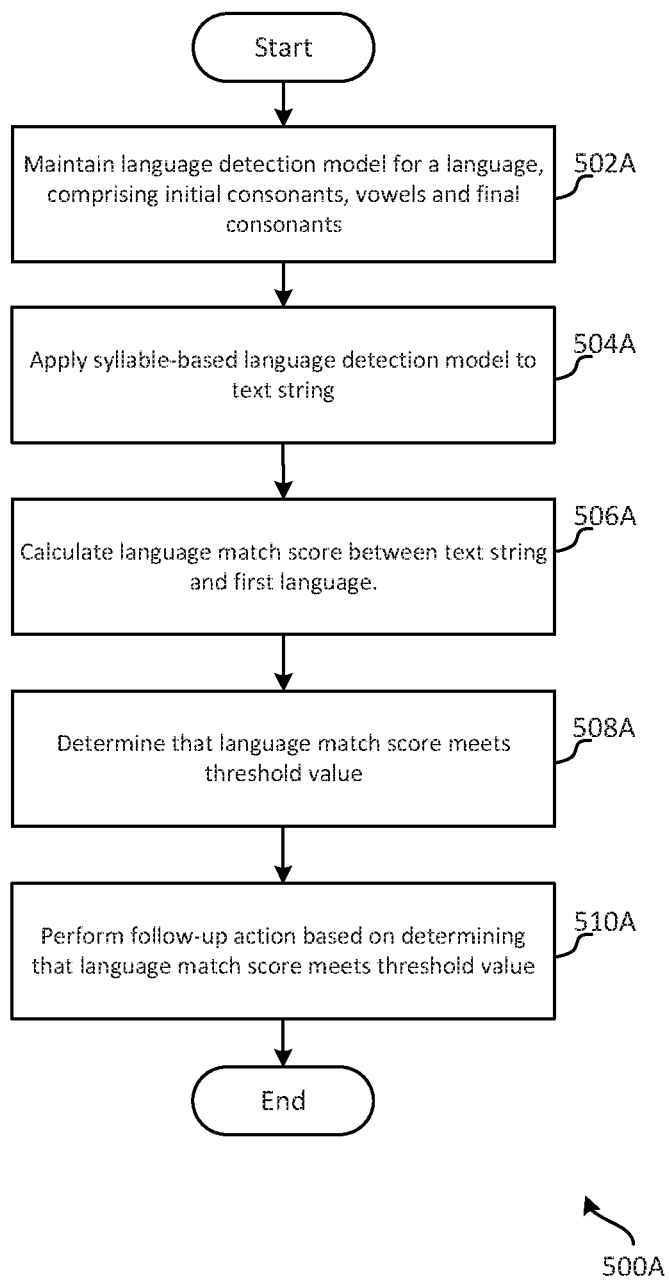
FIG. 5A is a method for determining whether a text string matches a language using a syllable-based language detection model and performing a follow-up action based on the determining.

FIG. 5A is a method 500A for determining a language of a text string based on application of a single syllable-based language detection model and performing a follow-up action based on the determining. The method 500A begins at a start operation and flow moves to operation 502A.

At operation 502A a language detection model for a first language is maintained. The language detection model may comprise a first list comprising identities of a plurality of syllable-initial consonants from a corpus of the first language, and weights for each of the plurality of syllable-initial consonants, a second list comprising identities of a plurality of vowel sequences from a corpus of the first language, and weights for each of the plurality of vowel sequences, and a third list comprising identities of a plurality of syllable-final consonants from the corpus, and weights for each of the plurality of syllable-final consonants. The weights may correspond to a frequency of the initial and final consonants in the corpus.

According to some examples, a preprocessing step (not shown) may quickly accept a word because it is in the common word list or may reject the word because it does not contain a vowel.

From operation 502A flow continues to operation 504A where a syllable-based language detection model is applied repeatedly to each syllable in succession in a word in the text string or stem in the word, starting at the beginning of the stem or word. An initial syllable is identified as discussed below, then processing moves to the position following the first syllable recognized and continues until the last character of the word or stem.

The application of the syllable-based language detection model to the word may comprise determining a syllable-initial consonant cluster score of the first consonant cluster in the remaining (unprocessed) word or stem, wherein the initial consonant cluster score corresponds to a frequency of the initial consonant cluster in the corpus (e.g., corpus 202). The application of the language detection model to the word or stem may further comprise determining a vowel cluster score of the first vowel cluster following the first consonant cluster in the remaining unprocessed portion of the word or stem. The application of the language detection model to the word or stem may further comprise determining which analysis is best of the following intersyllabic consonant cluster (into syllable-final cluster of the preceding syllable and syllable-initial cluster of the following syllable). The application of the language detection model to the word may further comprise determining a final consonant cluster score of a final consonant cluster included in the word (or each syllable in the word), wherein the final consonant cluster score corresponds to a frequency of the final consonant cluster in the corpus. The application of the syllable detection model may then repeat this process until all syllables in the word or stem are identified and scored or until it is determined that no such analysis consistent with the model is possible.

From operation 504A flow continues to operation 506A where a language match score between the text string and the first language is calculated from all combined syllable scores.

From operation 506A flow continues to operation 508A where a determination is made that the language match score meets a threshold value.

From operation 508A flow continues to operation 510A where a follow-up action is performed based on the determination that the language match score meets the threshold value. In examples, the follow-up action may comprise applying a language processing engine that is specific to the first language to the text string. In other examples, performing the follow-up action may comprise downloading a language package library for the first language to a computing device that the text string was initially input to. The language package library for the first language may comprise an embeddings library (e.g., a BERT library, an ELMo library).

From operation 510A flow moves to an end operation and the method 500A ends.

FIG. 5B is another affix-based method 500B for determining a language of a text string based on application of a single language detection model and performing a follow-up action based on the determining. The method 500B begins at a start operation and flow moves to operation 502B.

At operation 502B a language detection model for a first language is maintained. The language detection model may comprise a first list comprising identities of a plurality of prefixes from a corpus of the first language, and weights for each of the plurality of prefixes. The language detection model may further comprise a second list comprising identities of a plurality of suffixes from the corpus, and weights for each of the plurality of suffixes. The weights may correspond to a frequency of the prefixes and suffixes in the corpus.

From operation 502B flow may continue to a preprocessing step (not shown) which may quickly accept a word (e.g., classify the word as corresponding to a language) because it is in the common word list or may reject the word (e.g., not move forward through the application of the language detection model) because it does not contain a vowel.

According to examples, the language detection model may additionally comprise a list comprising identities of a plurality of initial consonants from the corpus, and weights for each of the plurality of initial consonants. The language detection model may additionally comprise a list comprising identities of a plurality of final consonants from the corpus, and weights for each of the plurality of final consonants. In some examples, the language detection model may additionally comprise a list of a plurality of vowel sequences from the corpus, and weights for each of the plurality of sequences.

From operation 502B flow continues to operation 504B where the language detection model is applied to a word in the text string. The application of the language detection model to the word may comprise determining a prefix score of a prefix included in the word, wherein the prefix score corresponds to a frequency of the prefix in the corpus. The application of the language detection model to the word may further comprise determining a suffix score of a suffix included in the word, wherein the suffix score corresponds to a frequency of the suffix in the corpus. In examples, the language detection model may be applied to each word in the text string.

During runtime in applying the model, the prefixes and suffixes in a token list (e.g., weighted prefixes and prefix sequences 404 and weighted suffixes and suffix sequences 406) may be sorted in decreasing order of length. If a word begins with a prefix or ends with a suffix, a determination may be made as to whether the beginning or end of the remaining substring starts or ends with a legal consonant sequence (including the null sequence if that is allowed in the language). If a determination is made that the consonant sequence is not legal, or if the remainder of the word does not contain a vowel, the next shortest prefix or suffix may be identified in the list that matches the word. For example, in the word "render", the training may determine that "re-" is a prefix, but then discard it, because "nd" is not in the list of consonant sequences that can legally begin an English word. This step may also be utilized to avoid falsely counting as a suffix the "-ion" in "lion".

From operation 504B flow continues to operation 506B where a language match score between the text string and the first language is calculated from at least the prefix score and the suffix score.

From operation 506B flow continues to operation 508B where a determination is made that the language match score meets a threshold value.

From operation 508B flow continues to operation 510B where a follow-up action is performed based on the determination that the language match score meets the threshold value. In examples, the follow-up action may comprise applying a language processing engine that is specific to the first language to the text string. In other examples, performing the follow-up action may comprise downloading a language package library for the first language to a computing device that the text string was initially input to. The language package library for the first language may comprise an embeddings library (e.g., a BERT library, an ELMo library).

From operation 510B flow moves to an end operation and the method 500B ends.

Figure 5C:
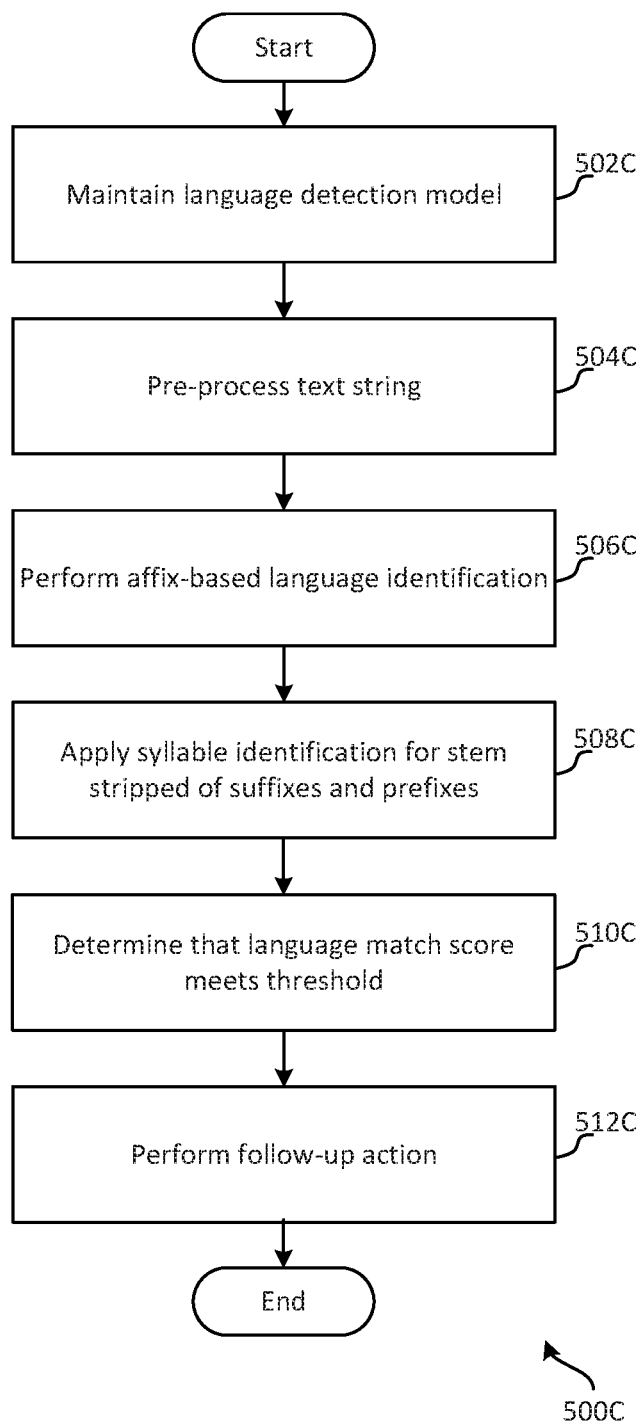
FIG. 5C is a method for determining whether a text string matches a language using both an affix-based and syllable-based language detection model and performing a follow-up action based on the determining.

FIG. 5C is another method 500C for determining a language of a text string based on application of a single language detection model and performing a follow-up action based on the determining. The method 500C combines the affix-based method described in FIG. 5B with the syllable-based method described in FIG. 5A. The method 500C begins at a start operation and flow moves to operation 502C.

From operation 502C flow continues to operation 504C where a preprocessing step may quickly accept a word because it is in the common word list or may reject the word because it does not contain a vowel.

From operation 504C flow continues to operation 506C where the affix-based language identification process described in relation to FIG. 5B is applied to the text string.

From operation 506C flow continues to operation 508C where the syllable-based language detection process described in relation to FIG. 5A is applied to the text string.

From operation 508C flow continues to operation 510C where a determination is made that a language match score meets a threshold value.

From operation 510C flow continues to operation 512C where a follow-up action is performed based on the determination that the language match score meets the threshold value. In examples, the follow-up action may comprise applying a language processing engine that is specific to the first language to the text string. In other examples, performing the follow-up action may comprise downloading a language package library for the first language to a computing device that the text string was initially input to. The language package library for the first language may comprise an embeddings library (e.g., a BERT library, an ELMo library).

From operation 512C flow moves to an end operation and the method 500C ends.

Figure 5D:
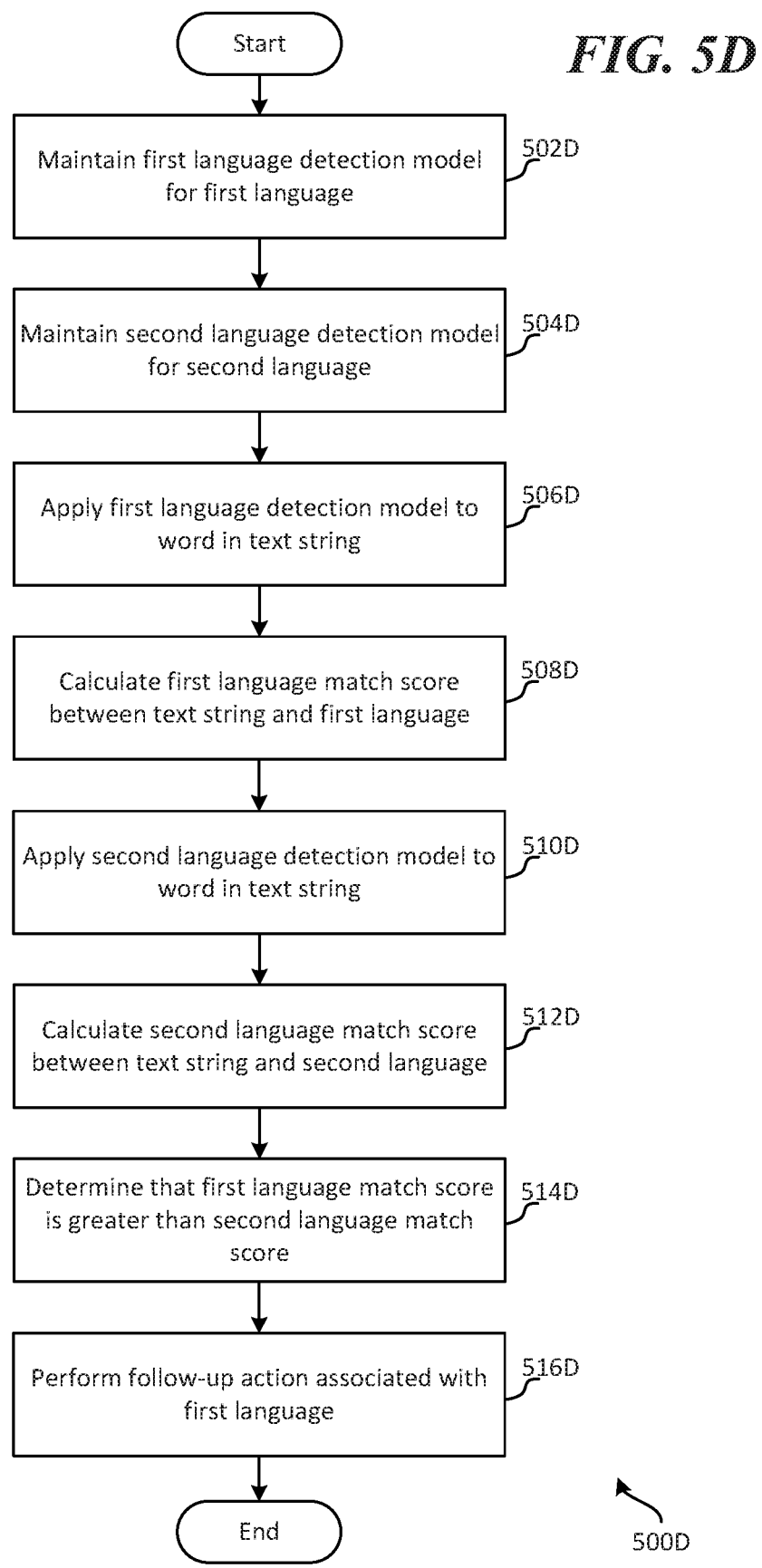
FIG. 5D is a method for choosing the best among a plurality of languages using a language detection model and performing a follow-up action based on the determining.

FIG. 5D is a method 500D for determining a language of a text string based on application of a plurality of language detection models and performing a follow-up action based on the determining. The method 500D begins at a start operation and flow moves to operation 502D.

At operation 502D a first language detection model for a first language is maintained. The first language detection model may comprise a first list comprising identities of a first plurality of initial consonants from a corpus of the first language, and weights for each of the first plurality of initial consonants. The first language detection model may further comprise a second list comprising identities of a first plurality of vowel sequences from the corpus of the first language, and weights for each of the first plurality of final consonants. The first language detection model may further comprise a third list comprising identities of a first plurality of final consonants from the corpus of the first language, and weights for each of the first plurality of final consonants. In some examples, the first language detection model may further comprise a list of prefixes and suffixes from the corpus of the first language and weights for each of those prefixes and suffixes. In some examples, the first language detection model may further comprise a list of common words from the corpus of the first language and weights for each of those common words. The weights may correspond to a frequency of each of the text units (tokens) in the corpus of the first language.

From operation 502D flow continues to operation 504D where a second language detection model for a second language is maintained. The second language detection model may comprise a fourth list comprising identities of a second plurality of initial consonants from a corpus of the second language, and weights for each of the second plurality of initial consonants. The second language detection model may further comprise a fifth list comprising identities of a second plurality of vowel sequences from the corpus of the second language, and weights for each of the second plurality of final consonants. The second language detection model may further comprise a sixth list comprising identities of a second plurality of final consonants from the corpus of the second language, and weights for each of the second plurality of final consonants. In some examples, the second language detection model may further comprise a list of prefixes and suffixes from the corpus of the second language and weights for each of those prefixes and suffixes. In some examples, the first language detection model may further comprise a list of common words from the corpus of the first language and weights for each of those common words. The weights may correspond to a frequency of each of the text units (tokens) in the corpus of the second language.

From operation 504D flow continues to operation 506D where the first language detection model is applied to a word in the text string. In examples, the first language detection model may be applied to every word in the text string.

From operation 506D flow continues to operation 508D where a first language match score between the text string and the first language is calculated based on application of the first language detection model to the text string. The first language match score may be calculated based, at least in part, on a determined initial consonant score for the first language for an initial consonant cluster included in the word and a determined final consonant score for the first language for a final consonant cluster included in the word.

From operation 508D flow continues to operation 510D where the second language detection model is applied to the text string. In examples, the second language detection model may be applied to every word in the text string.

From operation MOD flow continues to operation 512D where a second language match score between the second string and the second language is calculated based on application of the second language detection model to the text string. The second language match score may be calculated based, based at least in part, on a determined initial consonant score for the second language for an initial consonant cluster included in the word and a determined final consonant score for the second language for a final consonant cluster included in the word.

From operation 512D flow continues to operation 514D where a determination is made that the first language match score is greater than the second language match score.

From operation 514D flow continues to operation 516D where a follow-up action associated with the first language is performed based on the first language match score being greater than the second language match score. In examples, the follow-up action may comprise applying a language processing engine that is specific to the first language to the text string. In other examples, performing the follow-up action may comprise downloading a language package library for the first language to a computing device that the text string was initially input to. The language package library for the first language may comprise an embedding library (e.g., a BERT library, an ELMo library).

From operation 516D flow moves to an end operation and the method 500D ends.

Figure 6:
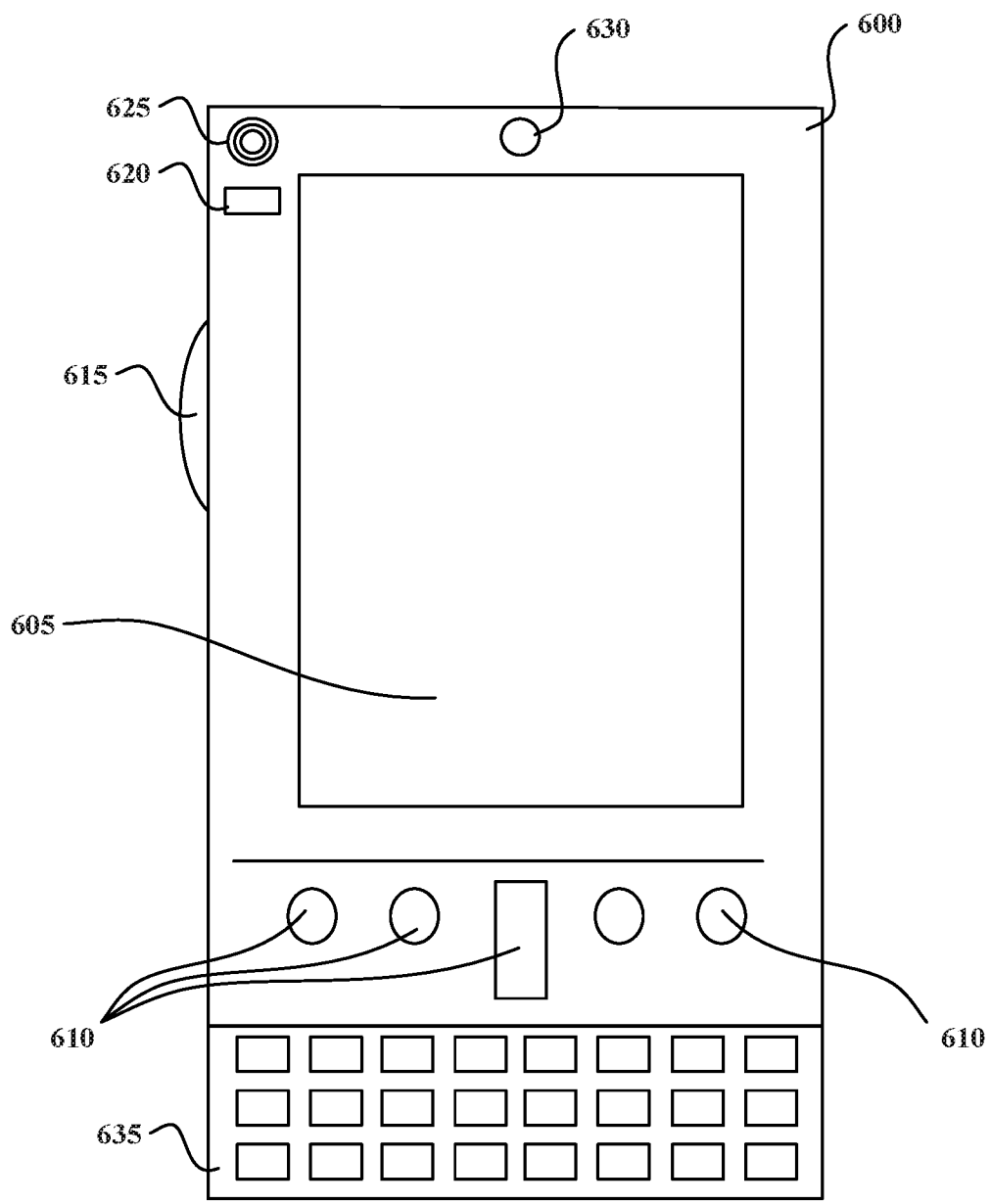
FIGS. 6 and 7 are simplified diagrams of a mobile computing device with which aspects of the disclosure may be practiced.
Figure 7:
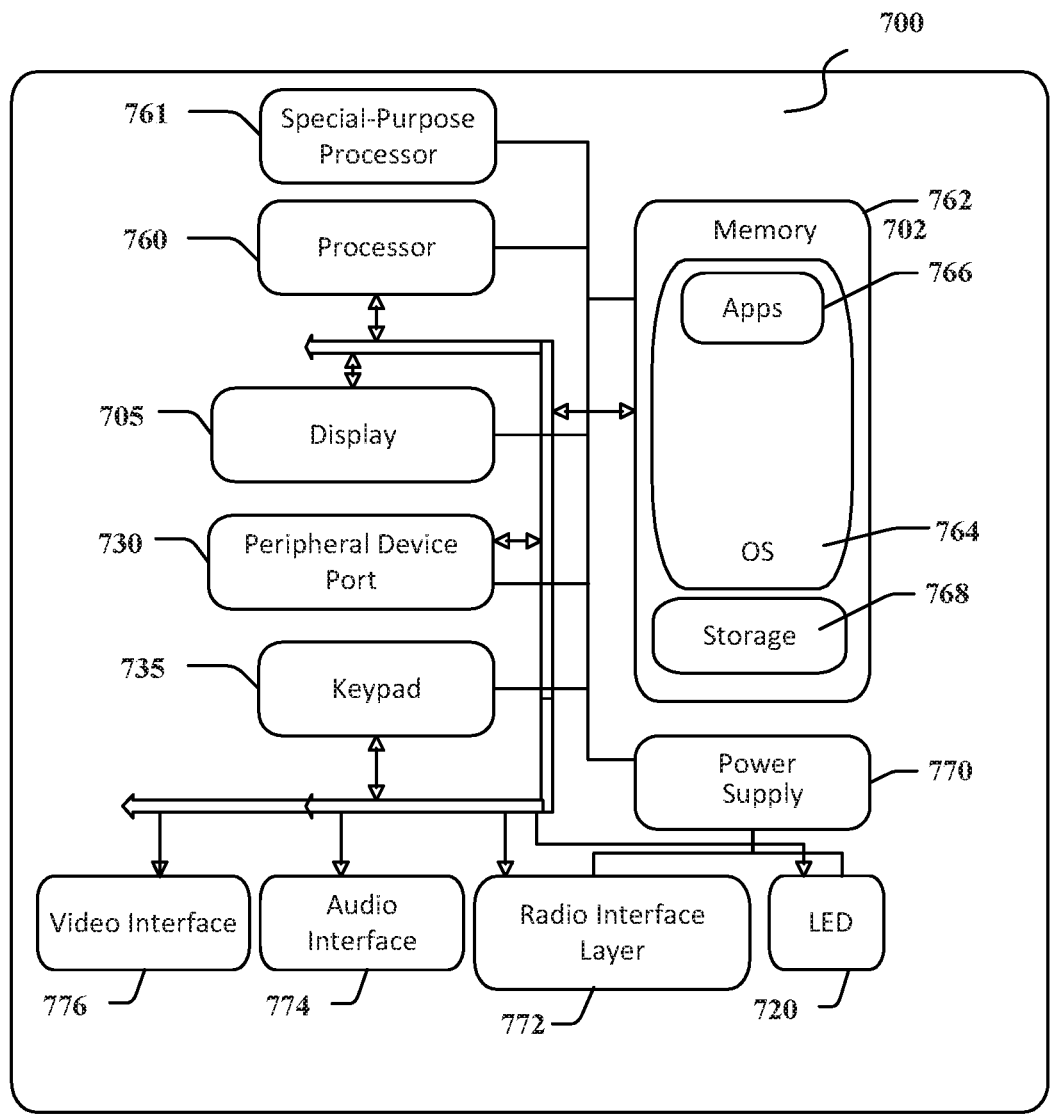

FIGS. 6 and 7 illustrate a mobile computing device 600, for example, a mobile telephone, a smart phone, wearable computer, a tablet computer, an e-reader, a laptop computer, AR compatible computing device, or a VR computing device, with which embodiments of the disclosure may be practiced. With reference to FIG. 6, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or fewer input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 7 is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including instructions for providing and operating a digital assistant computing platform.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 620 may be used to provide visual notifications, and/or an audio interface 774 may be used for producing audible notifications via the audio transducer 625. In the illustrated embodiment, the visual indicator 620 is a light emitting diode (LED) and the audio transducer 625 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 625, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 630 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7 by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

Figure 8:
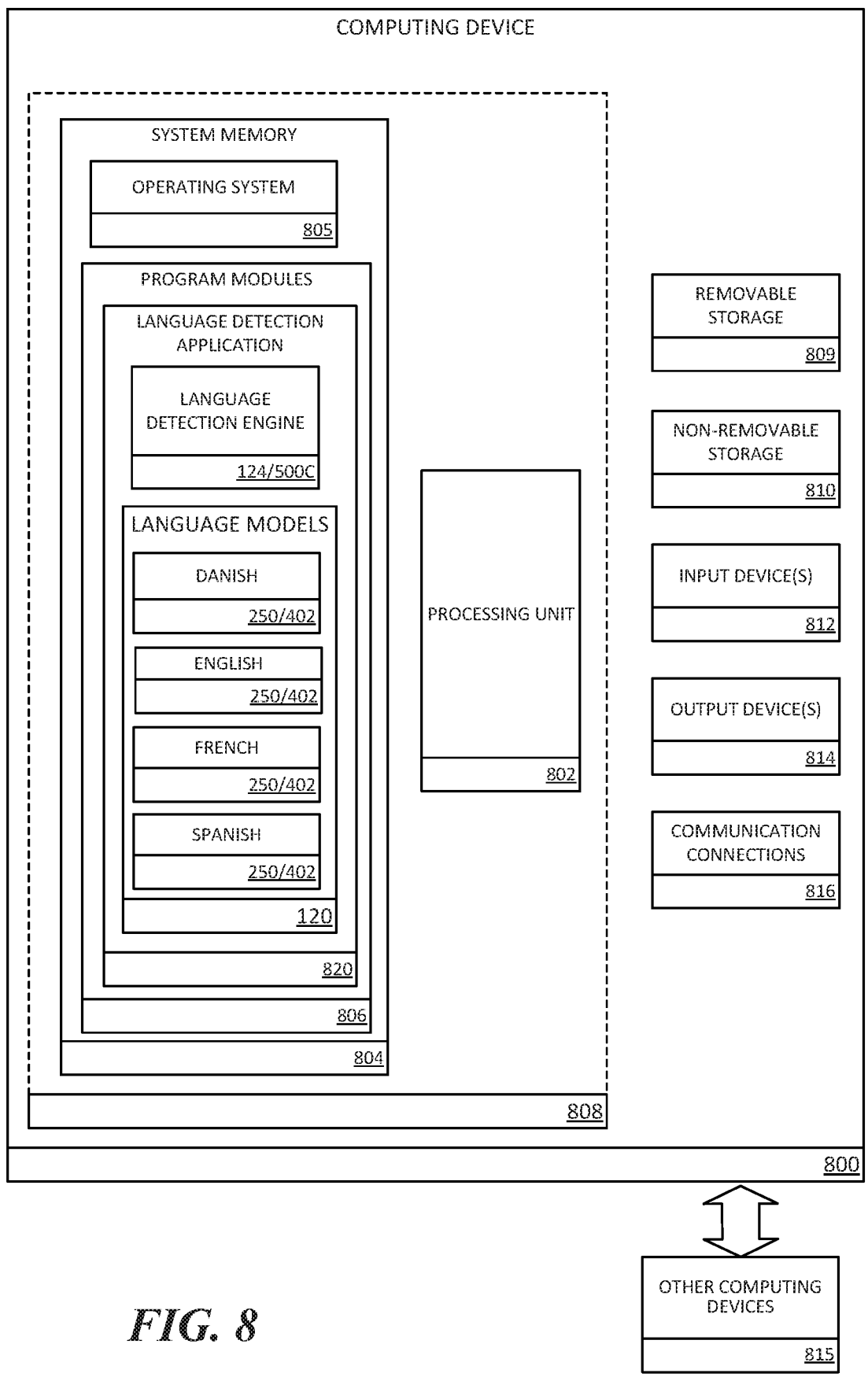
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may have computer executable instructions for training or executing one or more language detection models. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 suitable for running one or more linguistic and/or natural language processing programs. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., language detection application 820) may perform processes including, but not limited to, the aspects, as described herein. Language detection application 820 may include language detection module 124/500C which may read any or all of the language models described as final weighted individual language model 250 or 402. The language model data 120 may include one or more such models which may be trained as described in FIG. 2 and FIG. 3 and which may be deployed as described in FIG. 5A, FIG. 5B, FIG. 5C and/or FIG. 5D.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal. Computer-readable storage device does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9:
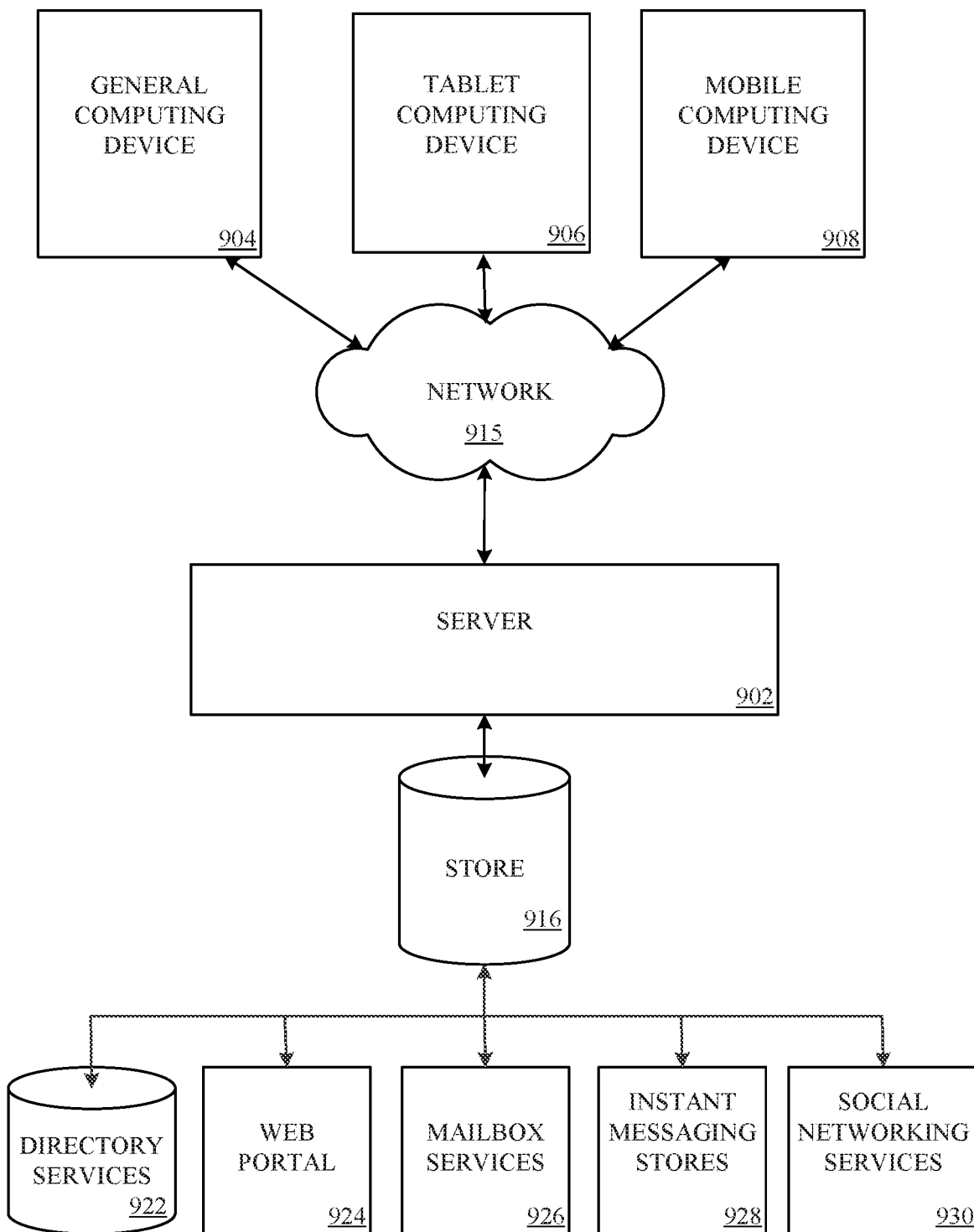
FIG. 9 is a simplified block diagram of a distributed computing system in which aspects of the present disclosure may be practiced.

FIG. 9 illustrates one aspect of the architecture of a system for processing data received at a computing system from a remote source, such as a personal/general computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. The program modules 806 may be employed by a client that communicates with server device 902, and/or the program modules 806 may be employed by server device 902. The server device 902 may provide data to and from a client computing device such as a personal/general computer 904, a tablet computing device 906 and/or a mobile computing device 908 (e.g., a smart phone) through a network 915. By way of example, the computer system described above with respect to FIGS. 6-8 may be embodied in a personal/general computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method for determining a language of a text string, the computer-implemented method comprising:
maintaining a syllabic language detection model for a first language, the language detection model comprising:
a first list comprising identities of a plurality of initial consonants from a corpus of the first language, and weights for each of the plurality of initial consonants, and
a second list comprising identities of a plurality of vowel sequences from the corpus of the first language, and weights for each of the plurality of vowel sequences, and
a third list comprising identities of a plurality of final consonants from the corpus, and weights for each of the plurality of final consonants;
applying the language detection model to a word in the text string, wherein the application comprises:
iteratively identifying all successive syllables within the word;

determining an initial consonant cluster score of an initial consonant cluster included in an identified syllable of the word, wherein the initial consonant cluster score corresponds to a frequency of the initial consonant cluster in the corpus, and determining a vowel sequence score of a vowel sequence included in the identified syllable of the word, wherein the vowel sequence score corresponds to a frequency of the vowel sequence in the corpus, and determining a final consonant cluster score of a final consonant cluster included in the identified syllable of the word, wherein the final consonant cluster score corresponds to a frequency of the final consonant cluster in the corpus;

calculating, from at least the initial consonant cluster score and the final consonant cluster score, a language match score between the text string and the first language;

determining that the language match score meets a threshold value; and performing a follow-up action based on the determination that the language match score meets the threshold value.

2. The computer-implemented method of claim 1, wherein the language detection model further comprises:
a fourth list comprising identities of a plurality of prefixes from the corpus, and weights for each of the plurality of prefixes.

3. The computer-implemented method of claim 2, further comprising:
determining a prefix score of a prefix included in the word, wherein the prefix score corresponds to a frequency of the prefix in the corpus; and
wherein the language match score between the text string and the first language is further calculated from the prefix score.

4. The computer-implemented method of claim 1, wherein the language detection model further comprises:
a third list comprising identities of a plurality of suffixes from the corpus, and weights for each of the plurality of suffixes.

5. The computer-implemented method of claim 4, further comprising:
determining a suffix score of a suffix included in the word, wherein the suffix score corresponds to a frequency of the suffix in the corpus; and
wherein the language match score between the text string and the first language is further calculated from the suffix score.

6. The computer-implemented method of claim 2, further comprising:
determining a prefix score of a prefix sequence included in the word, wherein the prefix score corresponds to a frequency of the prefix sequence in the corpus; and
wherein the language match score between the text string and the first language is further calculated from the prefix score.

7. The computer-implemented method of claim 4, further comprising:
determining a suffix score of a suffix sequence included in the word, wherein the suffix score corresponds to a frequency of the suffix sequence in the corpus; and
wherein the language match score between the text string and the first language is further calculated from the suffix score.

8. The computer-implemented method of claim 1, wherein performing the follow-up action comprises applying a language processing engine that is specific to the first language to the text string.

9. The computer-implemented method of claim 1, wherein performing the follow-up action comprises downloading a language package library for the first language to a computing device that the text string was initially input to.

10. The computer-implemented method of claim 1, wherein the language package library for the first language comprises a language embeddings library.

11. The computer-implemented method of claim 1, further comprising:
determining a cross-token score between a suffix of the word and a prefix of the word; and wherein
the language match score between the text string and the first language is further calculated from the cross-token score.

12. A system for determining a language of a text string, comprising:
a memory for storing executable program code; and
a processor, functionally coupled to the memory, the processor being responsive to computer-executable instructions contained in the program code and operative to:
maintain a first language detection model for a first language, the first language detection model comprising:
a first list comprising identities of a first plurality of syllable-initial consonants from a corpus of the first language, and weights for each of the first plurality of syllable-initial consonants,
a second list comprising identities of a first plurality of vowel sequences from a corpus of the first language, and weights for each of the first plurality of vowel sequences, and
a third list comprising identities of a first plurality of syllable-final consonants from the corpus of the first language, and weights for each of the first plurality of syllable-final consonants;
maintain a second language detection model for a second language, the second language detection model comprising:
a fourth list comprising identities of a second plurality of syllable-initial consonants from a corpus of the second language, and weights for each of the second plurality of syllable-initial consonants, and
a fifth list comprising identities of a second plurality of vowel sequences from a corpus of the second language, and weights for each of the second plurality of vowel sequences, and
a sixth list comprising identities of a second plurality of syllable-final consonants from the corpus of the second language, and weights for each of the second plurality of syllable-final consonants;
apply the first language detection model iteratively to a word in the text string;
calculate, based on application of the first language detection model to the text string, a first language match score between the text string and the first language;
apply the second language detection model iteratively to the word in the text string;

calculate, based on application of the second language detection model to the text string, a second language match score between the text string and the second language;

determine that the first language match score is greater than the second language match score to within a threshold value; and perform, based on the first language match score being greater than the second language match score to within the threshold value, a follow-up action associated with the first language.

13. The system of claim 12, wherein the first language detection model further comprises:

a seventh list comprising identities of a plurality of prefixes from the corpus of the first language, and weights for each of the plurality of prefixes; and a eighth list comprising identities of a plurality of suffixes from the corpus of the first language, and weights for each of the plurality of suffixes.

14. The system of claim 13, wherein the second language detection model further comprises:

a ninth list comprising identities of a second plurality of prefixes from the corpus of the second language, and weights for each of the second plurality of prefixes; and an tenth list comprising identities of a second plurality of suffixes from the corpus of the second language, and weights for each of the second plurality of suffixes.

15. A computer-readable storage device comprising executable instructions that, when executed by a processor, assists with determining a language of a text string, the computer-readable storage device including instructions executable by the processor for:

maintaining a language detection model for a first language, the language detection model comprising:

a first list comprising identities of a plurality of prefixes from a corpus of the first language, and weights for each of the plurality of prefixes, and a second list comprising identities of a plurality of suffixes from the corpus, and weights for each of the plurality of suffixes;

applying the language detection model to a word in the text string, wherein the application comprises:

determining a prefix score of a prefix included in the word, wherein the prefix score corresponds to a frequency of the prefix in the corpus, and determining a suffix score of a suffix included in the word, wherein the suffix score corresponds to a frequency of the suffix in the corpus;

calculating, from at least the prefix score and/or the suffix score, a language match score between the text string and the first language;

determining that the language match score meets a threshold value; and performing a follow-up action based on the determination that the language match score meets the threshold value.

16. The computer-readable storage device of claim 15, wherein the language detection model further comprises:

a third list comprising identities of a plurality of initial consonant sequences from the corpus, and weights for each of the plurality of initial consonant sequences;

a fourth list comprising identities of a plurality of vowel sequences from the corpus, and weights for each of the plurality of vowel sequences.

17. The computer-readable storage device of claim 16, wherein the instructions are further executable by the processor for:

stripping an optional prefix or optional suffix from the word; and iteratively identifying syllables in a stem of the word.

18. The computer-readable storage device of claim 15, wherein the language detection model further comprises:

a third list comprising identities of a plurality of final consonants from the corpus, and weights for each of the plurality of final consonants.

19. The computer-readable storage device of claim 18, wherein the instructions are further executable by the processor for:

determining a final consonant score for a final consonant included in the word, wherein the final consonant score corresponds to a frequency of the final consonant in the corpus; and wherein the language match score between the text string and the first language is further calculated from the final consonant score.

20. The computer-readable storage device of claim 15, wherein in performing the follow-up action, the instructions are further executable by the processor for:

downloading a language package library for the first language to a computing device that the text string was initially input to.

* * * * *